United States Patent
Tagliaferri et al.

(10) Patent No.: US 9,172,203 B2
(45) Date of Patent: Oct. 27, 2015

(54) LASER SYSTEM FOR THE MARKING OF METALLIC AND NON-METALLIC MATERIALS

(75) Inventors: Marco Tagliaferri, Taino (IT); Fabio Cannone, Melzo (IT); Orazio Svelto, Segrate (IT)

(73) Assignee: DATALOGIC AUTOMATION S.R.L., Monte San Pietro, Bologna (IT)

( * ) Notice: Subject to any disclaimer, the term of this patent is extended or adjusted under 35 U.S.C. 154(b) by 457 days.

(21) Appl. No.: 13/518,457

(22) PCT Filed: Dec. 20, 2010

(86) PCT No.: PCT/EP2010/007800
§ 371 (c)(1),
(2), (4) Date: Jun. 22, 2012

(87) PCT Pub. No.: WO2011/076376
PCT Pub. Date: Jun. 30, 2011

(65) Prior Publication Data
US 2012/0255936 A1 Oct. 11, 2012
US 2013/0068733 A2 Mar. 21, 2013

(30) Foreign Application Priority Data
Dec. 23, 2009 (IT) .......................... BG2009-A0067

(51) Int. Cl.
*B23K 26/00* (2014.01)
*H01S 3/08* (2006.01)
*H01S 3/094* (2006.01)
*H01S 3/0941* (2006.01)
*H01S 3/115* (2006.01)
*H01S 3/117* (2006.01)
*H01S 3/16* (2006.01)

(52) U.S. Cl.
CPC ......... *H01S 3/08045* (2013.01); *H01S 3/08031* (2013.01); *H01S 3/08* (2013.01); *H01S 3/08009* (2013.01); *H01S 3/08013* (2013.01); *H01S 3/09415* (2013.01); *H01S 3/094053* (2013.01); *H01S 3/115* (2013.01); *H01S 3/117* (2013.01); *H01S 3/1611* (2013.01); *H01S 3/1673* (2013.01)

(58) Field of Classification Search
CPC ... H01S 3/08031; H01S 3/08045; H01S 3/08; H01S 3/08009
USPC ......... 219/121.67, 121.68, 121.69; 372/6, 18, 372/21, 22, 25
See application file for complete search history.

(56) References Cited

U.S. PATENT DOCUMENTS

| 2003/0138004 A1 | 7/2003 | Pini et al. |
| 2005/0152426 A1* | 7/2005 | Dell'Acqua et al. ............ 372/69 |
| 2006/0171018 A1 | 8/2006 | Galvanauskas et al. |

(Continued)

FOREIGN PATENT DOCUMENTS

GB 2426789 A 12/2006

*Primary Examiner* — Thien S Tran
(74) *Attorney, Agent, or Firm* — King & Schickli, PLLC

(57) ABSTRACT

A laser system for the marking of metallic and non-metallic materials comprising a laser oscillator (1), characterized in that said laser oscillator (1) comprises: an active optical means (13) of the crystal laser type, a laser pump (10) to provide a pump energy to said active optical means (13); a mirror (14) disposed upstream said active optical means (13); an optical switch (16), apt to provide a pulsed laser beam, disposed downstream said active optical means (13); a mode adaptor (18) coupled to said optical switch (16); a predetermined length single-mode optical fiber (19), coupled to said mode adapter (18); a Bragg Grating type reflector coupled to said optical fiber (19).

11 Claims, 2 Drawing Sheets

(56) References Cited

U.S. PATENT DOCUMENTS

Figure 3:
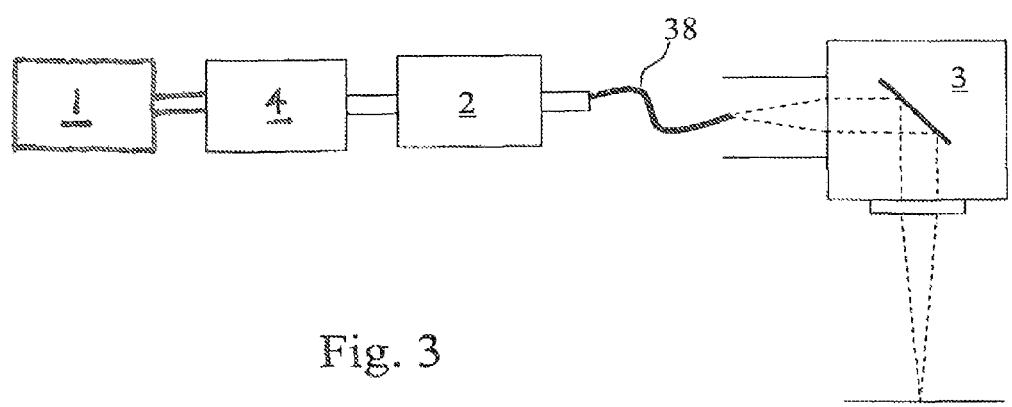

2007/0053387 A1* 3/2007 Dell'Acqua et al. ............ 372/21
2008/0043785 A1  2/2008 Long
2008/0056642 A1* 3/2008 Byer et al. ...................... 385/27
2010/0177794 A1* 7/2010 Peng et al. ...................... 372/25

* cited by examiner

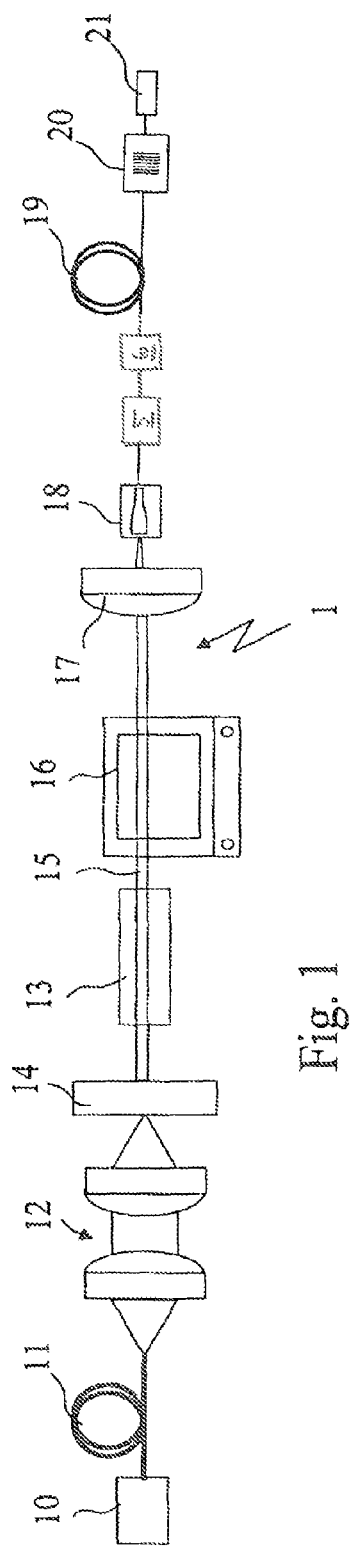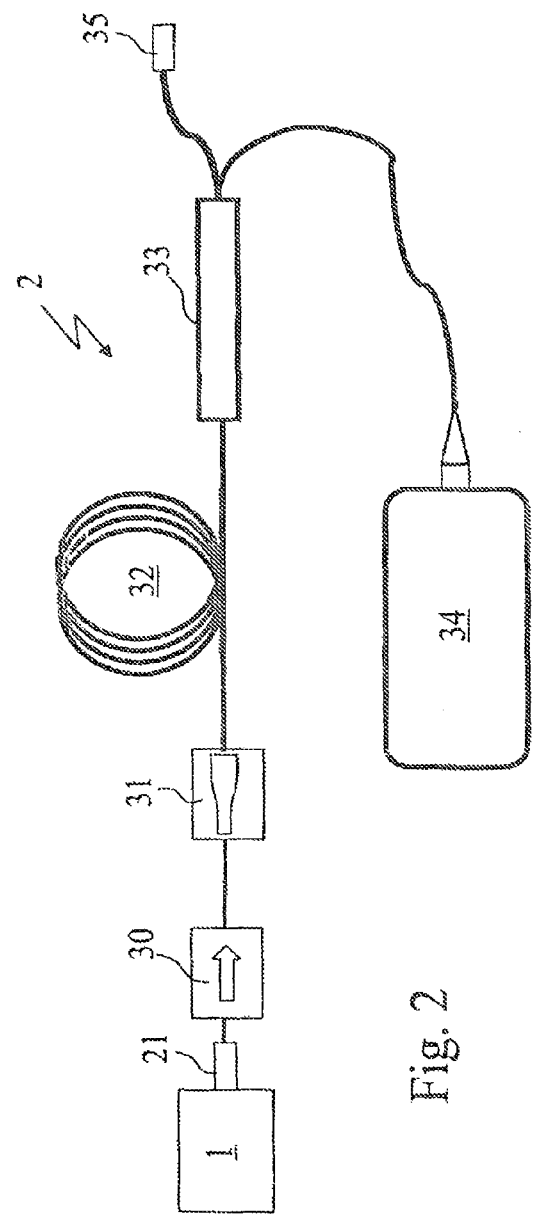
Fig. 1
Fig. 2

LASER SYSTEM FOR THE MARKING OF METALLIC AND NON-METALLIC MATERIALS

This application is the national stage of PCT/EP2010/007800, filed Dec. 20, 2010, which claims priority from Italian Application No. BG2009A000067, filed Dec. 23, 2009.

FIELD OF THE INVENTION

The present invention relates to a laser system for the marking of metallic and non-metallic materials and to a method for varying the optical pulses duration in laser systems. In particular, it refers to a laser system for the marking of metallic and non-metallic materials in solid state fibre.

BACKGROUND OF THE INVENTION

The sector of industrial marking using laser is in considerable expansion subsequent to the possibility of marking metallic and non-metallic materials with techniques such as surface or deep engraving of the material or through colour change of the material. In this sector solid state lasers excited by laser diodes (Diode-Pumped Solid-State, or DPSS) are conventionally used, with average powers generally below 100 W and operating with light pulse repetition obtained through the "Q-switching" technique. The laser beam, produced by diodes, is then sent, through suitable collimation optics, to the work surface. This transfer can take place in two ways: by moving the laser beam on a fixed sample using a system of galvanometric mirrors, or by moving the sample using a system of axes x-y-z on a fixed laser beam. The DPSS laser source is typically constituted by discrete optical components such as: mirrors, crystals, lenses and prisms. A laser diode for excitation, also called power pump diode, excites a suitably doped optical crystal. When population inversion takes place inside the crystal, a coherent and monochromatic electromagnetic radiation is generated at the wavelength corresponding to the emission transition of the doped crystal. This radiation is amplified inside the resonant laser cavity delimited by two mirrors: a mirror through which the pump beam is sent to the crystal, known as High Reflection Mirror (HR) and an Output Coupler (OC) mirror, thus giving rise to the laser radiation. Deconvolution of the emission spectrum of the crystal with the reflection and pass bands of said mirrors produces a highly monochromatic radiation (<0.1 nm). An acoustic-optical modulator, i.e. based on sound-light interaction, positioned inside the cavity produces a pulsed signal giving rise to Q-Switching. However, this solution presents some problems.

It is known that DPSS lasers are affected by the problem of thermal lens that causes a variation in the quality of the laser mode as a function of the intensity of the pump diode with which the crystal of the active material is irradiated. Consequently, the quality of the output beam, and therefore the quality of the industrial marking, depends on the output power. Moreover, the quality of the laser beam (known as Beam Quality Parameter, $M^2$) depends on the optical length of the resonator, defined as the distance between the HR and OC mirrors. That is, by varying the optical length, the quality of the beam changes. The time duration of the pulses also depends on this length. It is possible to define the time duration of the laser pulse by varying the aforesaid length. By increasing this length the time duration of the pulses increases. This variation is not random, but is dependent on the stability parameters of the laser, which in turn are dependent on the optical properties of the OC and HR mirrors and on the length of the thermal lens. However, when obtaining a stable laser cavity, such as to guarantee pulses of long duration, the problem of optical stability (optical alignment) of the cavity must be tackled. We can conclude that with DPSS technology it is not possible to obtain a laser source with a long pulse duration and simultaneously high mode quality. Moreover, the reliability of the laser source is limited as it is constituted by discrete elements and the cost of the whole system is relatively high and cannot be significantly decreased, as the cost of the discrete components cannot be further reduced, given that they cannot be mass produced.

For industrial machining operations, the DPSS laser source must be kept close to the work surface, in a single and relatively voluminous system, as transfer of the beam from the laser to the surface occurs through propagation in the free space. An alternative technology to the above relates to the use of a pulsed fibre laser. In a particularly common configuration, the laser is constituted by an oscillator that pumps a power amplifier, both made completely in optical fibre. In this architecture, the laser wavelength is not generated by pumping an optical crystal, as is the case in DPSS technology, but an optical fibre, known as active fibre, suitably doped with rare earths. There are two types of fibre laser architectures that allow pulsed laser beams to be produced. The first uses a low power seeder diode (a few tens of mW) whose signal, electronically pulsed, must be amplified several times to reach a sufficient power value. In the second type the laser beam, again emerging from a lower power diode, is pulsed using a Q-Switch, connected with the fibre. The beam output from this chain is conveyed, through a further fibre, to the work surface, guaranteeing remote positioning of the laser beam. Compared with the DPSS laser, the fibre laser has undoubted advantages. The quality of the beam and consequently of the marking does not depend on the output power and on the repetition rate, i.e. the fibre laser is not dependent on the effect of the thermal lens. Unlike DPSS lasers, the high quality of the laser beam ($M^2 \approx 1$) is not dependent on the laser power and is established by the single mode of the fibre.

Optical fibre components already available and with relatively low costs are used, as these are used in the telecommunications sector and are readily available. The source is more reliable, as the laser beam always propagates in optical fibre and no discrete optics are involved, as instead is the case in DPSS lasers. Finally, the source can be positioned remotely with respect to the work surface, as the beam is conveyed towards it directly from the optical fibre, while in DPSS lasers the beam is propagated to the work surface in the air. However, it must be stated that this latter solution also has undeniable disadvantages or problems. The intensity and the shape of the laser pulse emerging from a fibre laser is greatly influenced by non-linear phenomena such as: Scattering, i.e. Stimulated Brillouin Scattering (SBS), Photodarkening, Amplified Spontaneous Emission (ASE), which occur in the optical fibre and, principally, in the oscillator, phenomena that are completely absent in DPSS lasers as the laser radiation is produced in a crystal. In particular, phenomena of scattering, such as Stimulated Brillouin Scattering, compete largely with the laser efficiency giving rise to pre- and post-pulses that are amplified in the subsequent amplification chain reducing the efficiency of the laser and producing signals that can counterpropagate in the chain of the fibre laser colliding with and damaging sensitive elements such as the pump diodes. It is not possible to compensate this loss of efficiency by increasing the length of the fibre, as the intensity of Stimulated Brillouin Scattering depends on this parameter. Therefore, the longer the active fibre is, the more probable all non linear phenomena are, as for example in fibre laser architecture composed of a plurality of amplification stages.

Moreover, fibre laser architecture which involves the use of the Q-Switch is complicated by the need to launch the signal emerging from the fibre in the Q-Switch and subsequently receive it in this fibre. This type of architecture has a complex optical design, the objective of which is to guarantee maximum launching and collection efficiency in the single-mode fibre. This complexity is inexistent in a DPSS cavity as the Q-Switch must be proportioned only to the dimension of the laser mode. The output light is not linearly polarized, as is the case in some DPSS lasers, a fact that prevents possible and effective frequency duplication of the output beam, particularly useful in the case of micromachining operations, such as the formation of solar cells. Moreover, this radiation has a spectral width greater than one nanometer (FWHM Full Width at Half Maximum) not suitable for harmonic conversion, which is instead possible with laser radiation emitted from a DPSS source.

SUMMARY OF THE INVENTION

The object of the present invention is to provide a laser system for the marking of metallic and non-metallic materials capable of simultaneously overcoming the drawbacks of DPSSL architecture and of fibre lasers.

In accordance with the present invention, these and other objects are achieved by a laser system for the marking of metallic and non-metallic materials comprising a laser oscillator, characterized in that said laser oscillator comprises: an active optical means of the crystal laser type; a laser pump to provide a pump energy to said active optical means; a mirror disposed upstream said active optical means; an optical switch, apt to provide a pulsed laser beam, disposed downstream said active optical means; a mode adaptor coupled to said optical switch; a predetermined length single-mode optical fibre, coupled to said mode adapter; a Bragg Grating type reflector coupled to said optical fibre, and optionally, a non linear crystal for frequency duplication.

These objects are also achieved by a laser oscillator comprising an active optical means of the crystal laser type; a laser pump to provide a pump energy to said active optical means; a mirror disposed upstream said active optical means; an optical switch, apt to provide a pulsed laser beam, disposed downstream said active optical means; a predetermined length single-mode optical fibre, coupled to said optical switch; a Bragg Grating type reflector coupled to said optical fibre.

These objects are also achieved by a method for varying the optical pulses duration in a laser system according to claim 1, characterized in that it comprises the step of varying the length of said optical fibre.

Further characteristics of the invention are described in the dependent claims.

The object of this invention is a laser system for industrial machining, such as marking, constituted by an oscillator, of extremely small dimensions, based on an optical crystal as active means, that uses a Q-Switch, a single-mode fibre comprising an output mirror of the Bragg Grating type, and followed by an amplifier all in fibre.

In turn the optical beam is conveyed through a fibre, which allows transport of the laser beam directly on the work surface. Here the fibre is connected to a marking head that can be a galvanometric head (the beam is moved through galvanometric mirrors on the fixed sample to be processed) or a plotter (the laser beam is fixed and a motorised system is used for one, two or three dimensional movement of the sample).

In this invention the oscillator practically does not depend on the effect of the thermal lens and produces pulses without non linear phenomena, which can therefore be efficiently amplified in the amplifier producing a laser pulse with high mode quality.

This invention has various important elements.

A hybrid laser based on DPSS and fibre laser technology, i.e. a solid state fibre laser, which overcomes the limits of both architectures achieving an innovative laser structure.

An oscillator based on an active crystal and an acoustic-optical modulator that produces pulses substantially without non linear phenomena as the signal is not generated in the fibre but in the crystal.

An oscillator optically designed so as to achieve efficient mode matching between the mode of the active means and the mode of the fibre and reduced mechanical dimensions to guarantee mechanical/optical and thermal stability.

An oscillator having a discrete HR mirror, typical of DPSS architecture and a fibre OC mirror, i.e. a Fiber Bragg Grating, typical of fibre laser architecture. In this invention the Fiber Bragg Grating does not have the job of defining the wavelength of the laser radiation, as the emission wavelength is defined mainly by the narrow emission band of the active material (<0.1 nm).

An oscillator, which although based on an active crystal, has a pumped mode that is invariant in the fibre guaranteeing that it is insensitive to the thermal lens as the OC mirror is a Fiber Bragg Grating.

An oscillator that produces a laser pulse whose time duration depends on the length of the fibre, therefore selectable on the basis of the industrial machining requirements, varying only the length of this fibre without changing the physical dimensions of the oscillator, without the need for complex control electronics, and always maintaining a high mode quality of the beam, as it is propagating in the fibre. That is, an oscillator which produces laser pulses of the required time duration always with excellent beam quality.

A laser oscillator in which it is possible to introduce non linear crystals that allow the phenomenon of harmonic generation to be produced.

An amplification of simple configuration that can amplify the signal emerging from the oscillator without limits dictated by the presence of non linear phenomena, as the laser radiation is not produced in fibre but in a crystal.

A laser system with laser beam quality which is always ideal ($M^2=1$), regardless of the output power and of the repetition rate.

A laser system that produces spectrally limited laser pulses with high peak power, because of the narrow emission band of the active material used (<0.1 nm), therefore suitable for harmonic duplication for production of frequency duplicated lasers, also considering that the laser system produces linearly polarized light signals.

A modular laser system in which pump diode, oscillator, amplifier, and the transport system of the optical beam are connected through power connectors and therefore easily interchangeable without having to act on an alignment of the system.

A laser system that allows interfacing with a beam scanning system on a fixed machining sample or vice versa.

BRIEF DESCRIPTION OF THE DRAWING FIGURES

The characteristics and advantages of the present invention are apparent from the following detailed description of a practical embodiment thereof, illustrated by way of non-limiting example in the accompanying drawings, wherein:

FIG. 1 schematically shows a laser oscillator according to the present invention;

FIG. 2 schematically shows a laser oscillator connected to an optical amplifier, according to the present invention;

FIG. 3 schematically shows a laser oscillator connected to an optical amplifier, in turn connected, through an optical fibre, to a marking head composed either of a galvanometric scanning head or of a plotter, according to the present invention;

DETAILED DESCRIPTION OF THE INVENTION

With reference to the accompanying figures, a laser oscillator 1 according to the present invention, comprises a pump source 10, connected to a multi-mode optical fibre 11 that provides a laser pump to a collimation and focusing lens 12 and then to an active means 13, which are positioned along an axis known as pump axis.

The pump source 10 is constituted by a single emitter at 808 nm with maximum power of 8 W operating in thermally stabilized steady state. The electromagnetic radiation is sent to the collimation and focusing lens 12 through a multi-mode fibre 11 with core 200 μm having numeric aperture 0.22. The connection between the fibre and the lens 12 takes place through an industrial connector that allows rapid replacement of the diode without having to act on the inner section of the oscillator. Naturally, the maximum power of the pump source 10 is chosen on the basis of the power level to be produced by the oscillator 1.

The collimation and focusing lens 12 is constituted by two lenses, respectively capable of collimating and focusing the beam coming from the fibre 11 in the crystal of the active means 13, guaranteeing a pump mode, $\omega_p$, of 200 μm. The laser pump enters the active means 13 through a mirror 14, known as High Reflection (HR) mirror, provided with a highly reflecting dielectric coating (typically 99%) at the laser wavelength (1064 nm), on the side facing the inside of the active means 13 and with antireflective dielectric coatings at the pump wavelength of 808 nm, on both sides. The distance between the HR mirror 14 and the crystal 13 of the active means is 3 mm.

A Neodymium-doped yttrium Orthovanadate crystal (Nd:YVO4) with absorption coefficient of $\alpha=12.45$ cm$^{-1}$ is preferably used as active means 13. The use of this type of crystal guarantees a polarized beam. Alternatively, other types of crystal can be used as active means, such as Yb:YVO4, which manifests a wide absorption band so as to absorb fluctuations, due to thermal instability, of the pump radiation. It is known to those skilled in the art that variation of the type of active material causes variation of the emission wavelength of the pump system (10).

The wavelength of the crystal is fixed at 0.8 cm so as to guarantee complete absorption of the pump diode in the whole length of the crystal.

The active means 13 under the action of the pump laser beam generates a laser mode 15, having a radius $\omega_0=400$ μm, sent to an active acoustic-optical modulator 16, which is a Quartz crystal, i.e. a Q-Switch, which behaves as variable attenuator electronically controlled by a circuit, not shown. An acoustic wave propagating transversely in the crystal generates periodicity, therefore this flat wave causes a refraction of the light if the Bragg condition is satisfied. Alternatively, the modulator 16 can be of electro-optical type.

In this way, this device is able to generate pulsed laser beams and to completely extinguish the laser radiation for a certain time interval.

The laser mode 15 continues, in sequence, towards a focusing system 17, and an optical mode adapter 18 which is connected to a predetermined length single-mode optical fibre 19. Here the laser mode, generated in the crystal 13 passes from propagation in air to propagation confined in fibre.

A reflector 20 of Fiber Bragg Grating (FBG) type, is positioned at the end of the fibre 19 and preferably produced inside this fibre. This has the function of an output mirror of the Output Coupler (OC) type.

An optical connector 21 is connected to the fibre 19 through a splice.

The focusing system 17 is constituted by a lens with high transmission efficiency at 1064 nm, mounted on a device that allows an alignment in x-y-z and $\theta_x$, $\theta_y$. The focal length, f, of this lens is 25 mm so as to produce in the adapter 18 a mode with a radius $\omega_f=30$ μm.

The adapter 18, having an input radius of 35 μm, allows the laser mode focused by the lens 17 to be conveyed in the single-mode fibre 19. It can be schematized as a funnel that maintains the brightness of the beam.

The adapter 18 is preferably a mode adapter but a ball lens can also be used.

The optical fibre 19 (core=6±0.3 μm and cladding=125±0.5 μm) is a single-mode fibre with Mode-Field of 2.95 μm and maximum attenuation of 1.5 dB/Km. It has a V-number=2.4, therefore is single-mode. It allows conversion of cavity mode into a single-mode beam.

The distance between active crystal 13 and focusing lens 17 and the focal length of the lens 17 have been designed so as to couple the laser mode with the mode of the fibre with maximum efficiency.

In order to reduce cavity losses, the surface of the optical adapter 18 has an antireflective coating at 1064 nm.

The percentage of reflectivity at 1064 nm of the reflector 20 (50%-60%) is chosen so as to reduce power losses in the oscillator and to lower the power threshold of the laser.

The optical connector 21 is a common fibre FC/PC connector used for connection to the subsequent amplifier. Use of this connector allows the oscillator to be exchanged with an amplifier and vice versa without having to act on both systems. The entire sequence of fibre components (from 18 to 20) are preferably produced on the same fibre so as to avoid connections and, consequently, losses due to connection.

The spectral measurements show the absence of Amplified Spontaneous Emission. For this reason no ASE filter is inserted between the oscillator 1 and the amplifier 2.

The oscillator 1 therefore provides a laser beam at the wavelength of 1064 nm and spectral width 0.1 nm, with a power of 500 mW, with a pulse repetition frequency of 20 kHz, and a pulse duration that can vary from 50 to 350 ns, selectable only by varying the length of the fibre 19 present in the oscillator, from 0.1 m to 5 m. In particular, using a fibre 30 cm in length pulses of a duration of 80 ns, with repetition frequency 20 kHz and mean output power of 400 mW, are typically obtained. With a fibre 60 cm in length pulses of a duration of 100 ns are typically obtained, and with a fibre 150 cm in length pulses of a duration of 190 ns are typically obtained.

The distance between the mirror 14 and the reflector 20 defines the length of the cavity of the laser oscillator 1, and therefore the pulse duration.

The reflector 20 is not used to define the wavelength of the laser as it is defined by the spectral properties of the active crystal 13.

The distance between the mirror 14 and the focusing lens 17, in an example of embodiment, is equal to 183 mm, and the length of the fibre varies from 0.1 m to 5 m. Therefore, this distance can be deemed negligible with respect to the length of the fibre, and the width of the pulses is substantially defined by the length of the fibre 19.

The length of the fibre 19 is therefore the parameter that is varied to select the time duration of the pulses.

In a variant of the oscillator 1 described above, it is possible to produce intracavity duplication by inserting a non linear crystal 5 and a dichroic mirror 6 with an angle of incidence of 0° in the laser cavity. In this way, it is possible to produce visible laser radiation (e.g. 532 nm). The non linear crystal allows frequency duplication of the radiation at 1064 nm, while the dichroic mirror allows the cavity of the duplicated frequency to be delimited. The properties of this mirror are AR at the wavelength of 1064 nm and HR at the wavelength of 532 nm and the crystal is a Lithium Borate Oxide (LBO) Type I Crystal, i.e. $1064.0(o)+1064.0(o)=532.0(e)$. The Fiber Bragg Grating must be HR at the wavelength 1064 nm and AR at the wavelength 532 nm. The crystal is maintained at the optimum temperature to maximize conversion efficiency. The dichroic mirror is aligned so as to launch the beam at 532 nm produced in the fibre 18 always through the lens 17. Naturally, the single-mode fibre 19 must be a fibre suitable to transmit radiation at 532 nm, for example, Germanium-free. Knowing this example, it is clear that the insertion of further crystals allows further harmonic orders to be produced.

An amplifier 2 is connected to the oscillator 1, through the connector 21. An optical insulator 4 is disposed between the oscillator and the amplifier. The amplifier 2 comprises, in sequence, after the connector 21, an optical isolator 30, a single-mode optical adapter 31, followed by an active fibre 32 and then a combiner 33. The amplifier comprises only components in fibre.

From the element 21 to the element 31 the fibre has specifications identical to the fibre 19 present in the oscillator.

The optical isolator 30 is an integrated component in fibre that is connected by splices to the fibre of the amplifier. It has an insulation degree of 30 dB, and allows propagation of the radiation at 1064 nm only in oscillator-amplifier direction.

The optical adapter 31 acts as an inverse funnel with respect to the adapter 18. In fact, the dimension of the fibre core passes from 6 μm (diameter) to 25 μm (diameter). Considering that the dimension of the cladding of the fibre 19 is 125 μm, in order to preserve brightness, the active fibre 32 is a Large Mode Area Ytterbium Doped Fiber with an absorption coefficient at 940 nm of 1.7 dB/m core and cladding dimensions respectively 25 μm and 400 μm.

Consequently, to produce a 10 dB-20 dB amplifier, suitably considering all the various sources of loss, the length of the active fibre 32 is 5-12 m. The active fibre 32 is pumped from a set of diodes 34.

The set of diodes 34 is composed of 6 single emitters with a power of 8 W at 940 nm, each connected with a fibre having core and cladding respectively of 105 μm and 125 μm, mutually combined through a combiner.

The diodes 34 emit radiation at 940 nm as the active fibre 32 has a wide absorption band at 940 nm. The fibre 32 has a cross-section more or less constant between 920 nm and 960 nm, therefore a variation in emission wavelength of the diodes 34 due to thermal effects (typically 0.3 nm/K) and has no effects in absorption of the fibre 32. The development of new types of fibres will allow increasing improvement of the efficiency of the amplifier, thereby allowing a reduction in the number of diodes present in 34.

The laser pump generated by the pump 34 at 940 nm reaches the combiner 33 and provides the laser beam, received by the oscillator 1, amplified, to a connector 35.

The active fibre 32 is connected to the passive fibre of the combiner 33 through a splice. The coupling efficiency is maximum as the active/passive fibres have the same properties.

The amplifier is connected to the optical beam transport system through the connector 35. The optical beam transport system allows remote positioning of the beam. It is composed of a fibre 38 of a length variable from 1 m to 10 m with cladding of 400 μm coated with an industrial sheath capable of withstanding bending and pressures without damage to the internal fibre. The fibre 38 is connected to a marking head 3 through an optical isolator, not shown.

The optical isolator is connected directly to an optical collimator (not shown) which allows collimation of the beam emerging from the laser system. The optical isolator acts as suppressor of retroreflection and scattering that can come from the sample being machined. Its transmission efficiency is greater than 90% with an isolation level >30 dB.

The marking head 3 can provide movement of the beam through two galvanometric mirrors or movement of the sample through a plotter. In the first case, the laser beam is moved on the fixed sample and vice versa in the second case. The marking head 3 can be replaced with a suitably designed optical focusing system, capable of focusing the beam emerging from the fibre 38 on a sample moved through a plotter.

The invention claimed is:

1. A laser system for the marking of metallic and non-metallic materials comprising a laser oscillator, characterized in that said laser oscillator comprises: an active optical means of the crystal laser type, a laser pump to provide a pump energy to said active optical means; a mirror disposed upstream said active optical means; an optical switch, apt to provide a pulsed laser beam, disposed downstream said active optical means; a mode adapter coupled to said optical switch and disposed downstream said optical switch; a predetermined length single-mode first optical fibre, coupled to said mode adapter and disposed downstream said adapter and said optical switch; and a Bragg Grating type reflector coupled to said first optical fibre.

2. The laser system according to claim 1, characterized in that said mirror and said reflector define a cavity of said laser oscillator and the length of said optical fibre determines a duration of the pulses of said pulsed laser beam.

3. The laser system according to claim 1, characterized in that said optical switch comprises an acoustic-optical modulator.

4. The laser system according to claim 1, characterized in that the laser system presents a fibre optical amplifier coupled to said laser oscillator and an optical insulator disposed between said laser oscillator and said amplifier.

5. The laser system according to claim 1, characterized in that said pump laser is a semiconductor laser.

6. The laser system according to claim 1, characterized in that the laser system presents a focusing lens of said pulsed laser beam to couple said pulsed laser beam at the entrance of said optical fibre.

7. The laser system according to claim 1, characterized in that said active optical means comprises a Neodymium-doped yttrium Orthovanadate crystal.

8. The laser system according to claim 1, characterized in that the laser system comprises a second optical fibre at the exit of said amplifier to provide a laser beam to a laser head for marking metallic and non-metallic materials.

9. The laser system according to claim 1, characterized in that said system provides at the exit thereof a polarized single-mode laser beam.

10. A laser oscillator comprising an active optical means of the crystal laser type; a pump laser to provide a pump energy to said active optical means; a mirror located upstream said active optical means; an optical switch, apt to provide a pulsed laser beam, located downstream said active optical means; a mode adapter coupled to said optical switch and disposed downstream said optical switch; an optical fibre having a predetermined length, coupled to said optical switch and disposed downstream said adapter and said optical switch; and a Bragg Grating type reflector coupled to said optical fibre.

11. A laser system according to claim 1, characterized in that the laser system further comprises a non linear crystal and a dichroic mirror to make a harmonic duplication effect.

\* \* \* \* \*